(12) United States Patent
Huang et al.

(10) Patent No.: US 8,360,119 B2
(45) Date of Patent: Jan. 29, 2013

(54) HIGH-PRESSURE INFLATION PUMP

(76) Inventors: Ying-Che Huang, Sioushuei Township, Changhua County (TW); Chun-Ming Huang, Sioushuei Township, Changhua County (TW)

( * ) Notice: Subject to any disclaimer, the term of this patent is extended or adjusted under 35 U.S.C. 154(b) by 373 days.

(21) Appl. No.: 12/878,086

(22) Filed: Sep. 9, 2010

(65) Prior Publication Data

US 2011/0284124 A1 Nov. 24, 2011

(30) Foreign Application Priority Data

May 20, 2010 (TW) ................................ 99116200 A (51) Int. Cl.
*B65B 1/04* (2006.01)
*F16K 15/20* (2006.01)
(52) U.S. Cl. ........... 141/329; 141/38; 137/223; 137/231
(58) Field of Classification Search ............... 141/38, 141/329; 137/223–234.5; 441/93, 94
See application file for complete search history.

(56) References Cited

U.S. PATENT DOCUMENTS

| | | | | |
|---|---|---|---|---|
| 3,448,779 | A * | 6/1969 | Horwitt | 141/38 |
| 3,809,288 | A * | 5/1974 | Mackal | 222/5 |
| 4,867,209 | A * | 9/1989 | Santoiemmo | 141/19 |
| 4,969,493 | A * | 11/1990 | Lee | 141/38 |
| 5,316,055 | A * | 5/1994 | Brimmer | 141/38 |
| 5,329,975 | A * | 7/1994 | Heitel | 141/19 |
| 6,267,161 | B1 * | 7/2001 | Barbieri | 141/383 |
| 6,276,391 | B1 * | 8/2001 | Wu | 137/223 |
| 7,260,943 | B2 * | 8/2007 | Carrubba et al. | 62/77 |

* cited by examiner

*Primary Examiner* — Timothy L Maust (57) ABSTRACT

A high-pressure inflation pump includes a head, a nozzle, a piercing member, and a resilient member. The head includes a compartment, a passageway, and a threaded section. The piercing member includes a base, a piercing portion, and an air guiding hole. The piercing portion includes an annular abutting shoulder for pressing against an end face of a threaded end of a high-pressure gas container engaged with the threaded section of the head, providing an airtight state. The resilient member includes a support end, a pressing end, and a chamber. The piercing member is received and positioned in the chamber without blocking flow of gas in the high-pressure gas container into the air guiding hole, allowing rapid inflation of a tire engaged with the nozzle and allowing the high-pressure gas container to be used many times to save resources.

18 Claims, 8 Drawing Sheets

HIGH-PRESSURE INFLATION PUMP

BACKGROUND OF THE INVENTION

The present invention relates to an inflation pump and, more particularly, to a high-pressure inflation pump that can be used with a high-pressure gas container to release high-pressure gas in the high-pressure gas container for inflation purposes while allowing the high-pressure gas container to be used many times to save resources.

Figure 1:
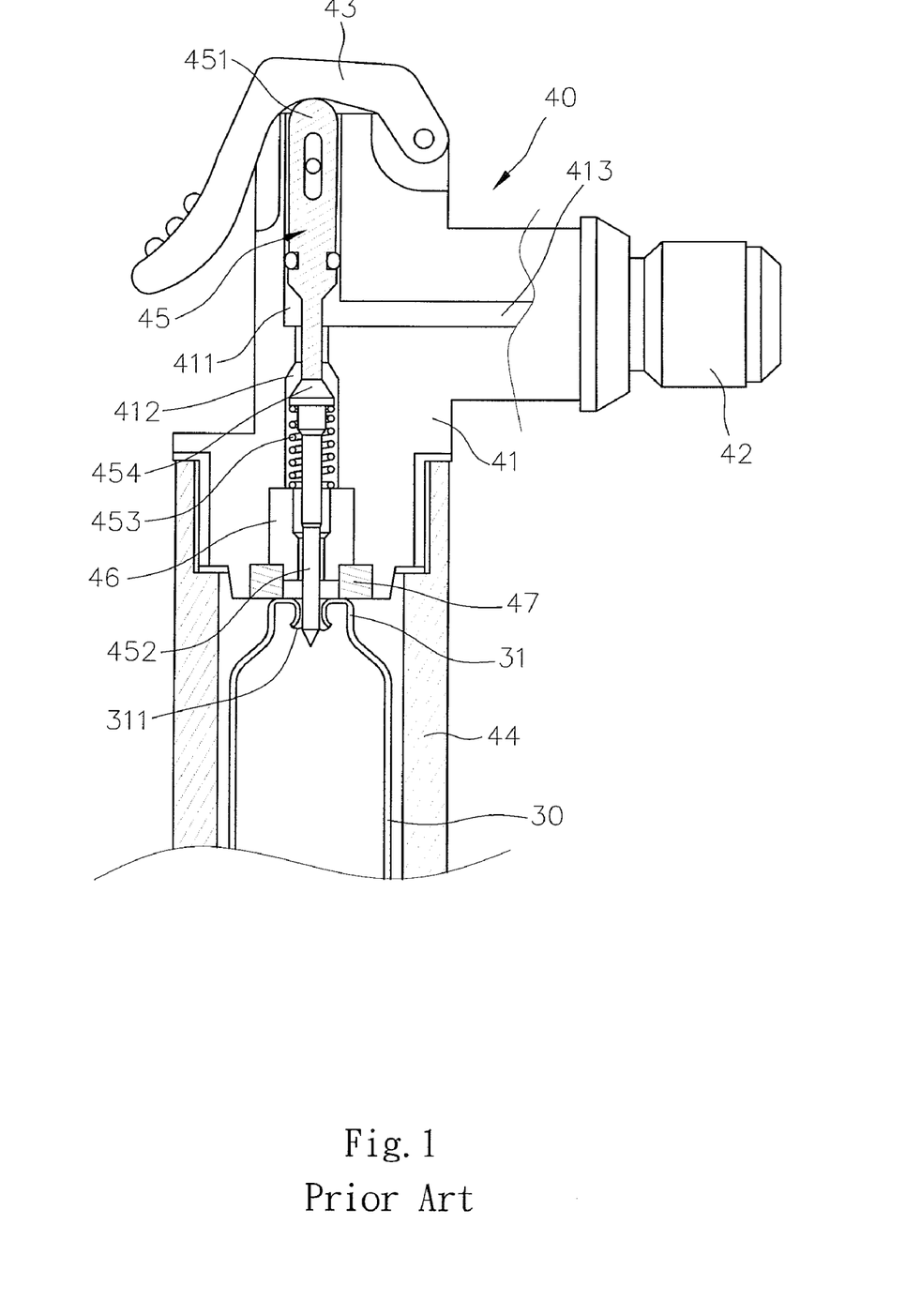
FIG. 1 shows a partial, cross sectional view of a conventional high-pressure pump.

FIG. 1 shows a conventional $CO_2$ inflation pump 40 for rapidly inflating tires of motorcycles or bicycles. The $CO_2$ inflation pump 40 includes a body 41 to which a high-pressure $CO_2$ container 30 is attached. The body 41 includes a first space 411, a second space 412, and a passageway 413. A nozzle 42 is mounted to an outer end of the passageway 413. The nozzle 42 can be engaged with a valve (not shown) of a tire such that carbon dioxide in the high-pressure $CO_2$ container 30 can flow through the passageway 314 into the tire. A piercing member 45 includes an actuating portion 451 movably received in the first space 411 and a piercing portion 452 movably received in the second space 412. A washer 454 is provided at an end of actuating portion 451 connected to the piercing portion 452. A spring 453 is mounted in the second space 412 and around the piercing portion 452 to bias the piercing member 45 to a desired level in the first and second spaces 411 and 412. A lever 43 is mounted to the body 41 and can be pivoted to press against an upper end of the actuating portion 451 outside of the body 41 so as to move the piercing section 452 downward. A sleeve 44 is mounted around a lower portion of the body 41 having the second space 412. The high-pressure $CO_2$ container 30 is received in a space defined by the sleeve 44. In this conventional structure, the sleeve 44 includes an upper opening in threading connection with the lower portion of the body 41. When the sleeve 44 is rotated and, thus, moved upward, a bottom of the sleeve 44 pushes the high-pressure $CO_2$ container 30 upward such that an end face 311 of a threaded end 31 of the high-pressure $CO_2$ container 30 reaches a position below a lower opening of the second space 412. When the piercing member 45 is pressed against by the lever 43, the piercing portion 452 is moved downward and pierces the end face 311, causing outflow of high-pressure $CO_2$ in the high-pressure $CO_2$ container 30 to the nozzle 42 through passageway 413. A block 46 and a sealing ring 47 are optionally mounted in the lower opening of the second space 412 to provide a sealing effect at the end face 311 by the sealing ring 47.

Although the conventional $CO_2$ inflation pump 40 can rapidly inflate a tire with high-pressure $CO_2$ in the high-pressure $CO_2$ container 30, the manufacturing costs are high due to complicated structure of the conventional $CO_2$ inflation pump 40. Furthermore, the piercing member 45 is relatively long and, thus, creates considerable torque during operation. Since the high-pressure $CO_2$ container 30 is a mass-produced consumptive product that does not require high surface precision in view of cost consideration, it is not uncommon that the end face 311 is curved and has an irregular curvature due to unevenness such that the piercing member 45 may be deformed and damaged by a force component perpendicular to the piercing direction at the piercing point where the piercing section 452 pierces the end face 311.

Furthermore, in the conventional $CO_2$ inflation pump 40, the carbon dioxide flows from the high-pressure $CO_2$ container 30 into the space defined by the sleeve 44 after the end face 311 is pierced by the piercing member 45. The carbon dioxide keeps flowing from the high-pressure $CO_2$ container 30 into the space defined by the sleeve 44 when the piercing member 45 is returned to its original position. Although the sealing ring 47 can provide an airtight effect in a passageway between the first and second spaces 411 and 412 to stop inflating, the sealing effect between the sleeve 44 and the body 41 can affect the pressure-maintaining effect in the high-pressure $CO_2$ container 30, and the manufacturing costs are increased for obtaining structure with a reliable sealing effect.

BRIEF SUMMARY OF THE INVENTION

According to a first aspect of the present invention, a high-pressure inflation pump includes a head having a compartment, a passageway in communication with the compartment, and a threaded section. The compartment is located intermediate the passageway and the threaded section. The passageway includes an opening formed in an outer periphery of the head. The threaded section is adapted to engage with a threaded end of a high-pressure gas container. A nozzle is mounted to the opening of the head. The nozzle is adapted to engage with a valve of a tire and to guide high-pressure gas in the high-pressure container flowing through the passageway into the tire for inflating the tire. A piercing member is received in the compartment of the head and includes a base and a piercing portion. The base has an outer diameter larger than a diameter of the passageway. The base abuts an intersection of the compartment and the passageway. The piercing portion includes an annular abutting shoulder. The piercing portion is adapted to pierce an end face of the threaded end of the high-pressure gas container. The annular abutting shoulder is adapted to press against the end face of the threaded end of the high-pressure gas container when the end face of the threaded end of the high-pressure gas container is pierced by the piercing portion and when the high-pressure gas container is in a non-inflating position. The base includes a hole in communication with the passageway. The base further includes an air guiding hole extending from an outer periphery of the base through the hole. A resilient member is received in the compartment and includes a support end, a pressing end, and a chamber formed in the support end and the pressing end. The piercing member is received in the chamber with a deformation space formed between an outer periphery of the piercing member and an inner periphery of the chamber. The inner periphery of the chamber contacts an outer periphery of the piercing portion at the pressing end by at least one first contact point. The inner periphery of the chamber contacts the outer periphery of the base at the support end by at least one second contact point.

According to a second aspect of the present invention, a high-pressure inflation pump includes a head having a compartment, a passageway in communication with the compartment, and a threaded section. The compartment is located intermediate the passageway and the threaded section. The passageway includes an opening formed in an outer periphery of the head. The threaded section is adapted to engage with a threaded end of a high-pressure gas container. A nozzle is mounted to the opening of the head. The nozzle is adapted to engage with a valve of a tire and to guide high-pressure gas in the high-pressure container flowing through the passageway into the tire for inflating the tire. A piercing member is received in the compartment of the head and includes a base and a piercing portion. The base has an outer diameter larger than a diameter of the passageway. The base abuts an intersection of the compartment and the passageway. The piercing portion includes an annular abutting shoulder. The piercing portion is adapted to pierce an end face of the threaded end of the high-pressure gas container. The annular abutting shoulder is adapted to press against the end face of the threaded end of the high-pressure gas container when the end face of the threaded end of the high-pressure gas container is pierced by the piercing portion and when the high-pressure gas container is in a non-inflating position. The base includes a hole in communication with the passageway. The base further includes an air guiding hole extending from an outer periphery of the base through the hole. A resilient member is received in the compartment and includes a support end, a pressing end, and a chamber. A pressing member is mounted to the pressing end of the resilient member. The pressing member includes an annular plate having a through-hole. A resilient ring is mounted in the pressing member. The resilient ring is sandwiched between the pressing member and the end face of the high-pressure gas container received in the compartment, providing an airtight effect between the pressing member and the end face of the high-pressure gas container.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 2:
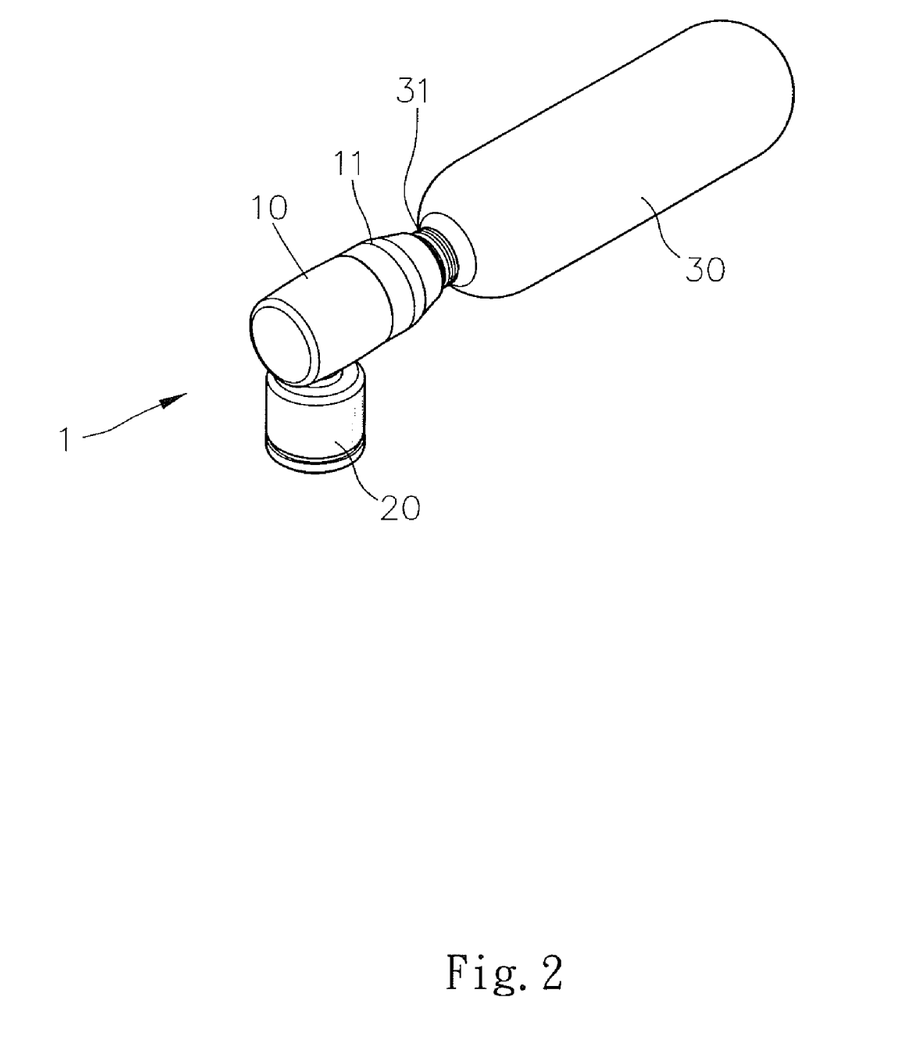
FIG. 2 shows a perspective view of a high-pressure inflation pump according to the preferred teachings of the present invention with a high-pressure gas container attached to the high-pressure inflation pump.
Figure 3:
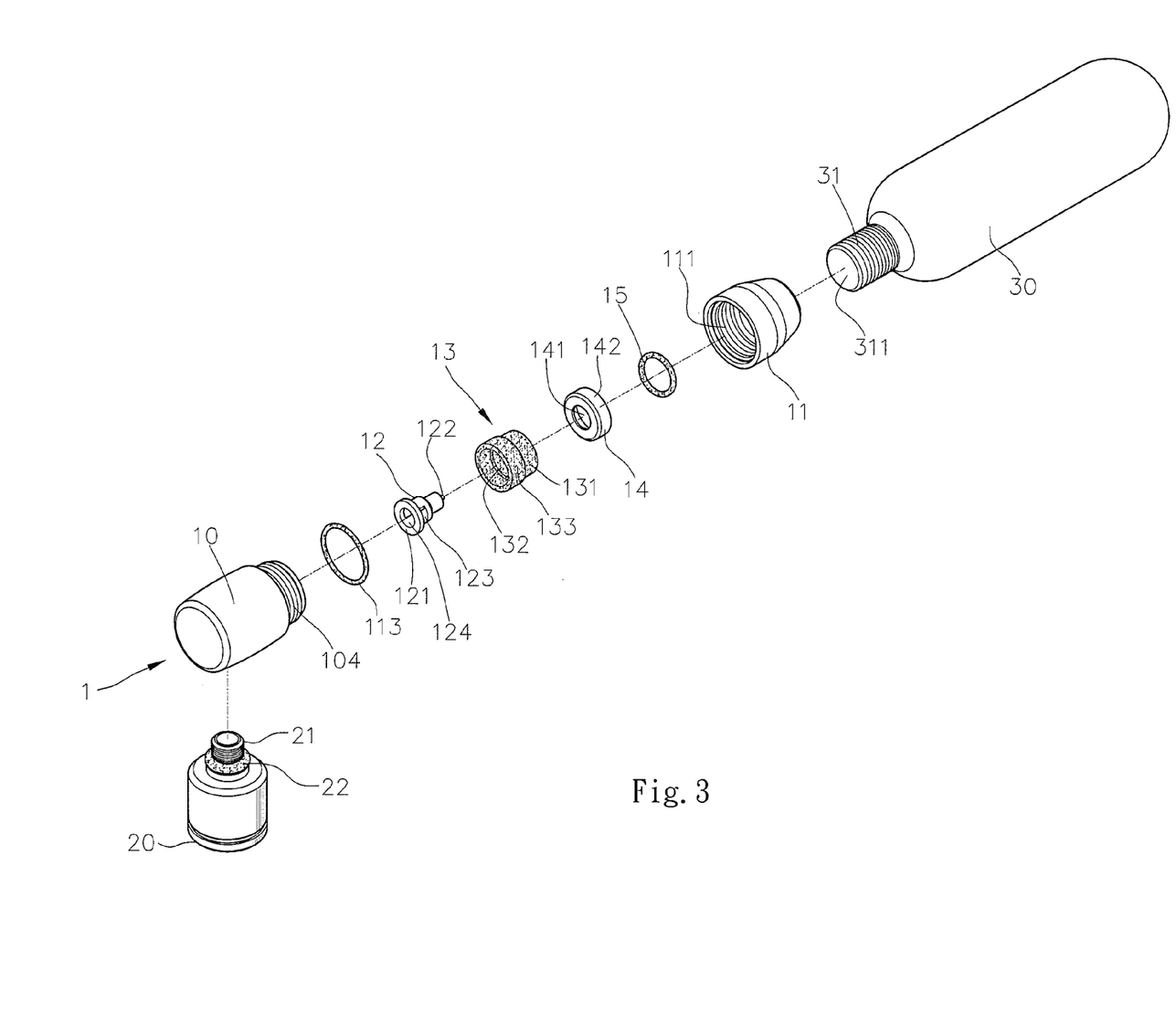
FIG. 3 shows an exploded, perspective view of the high-pressure inflation pump and the high-pressure gas container of FIG. 2.
Figure 4:
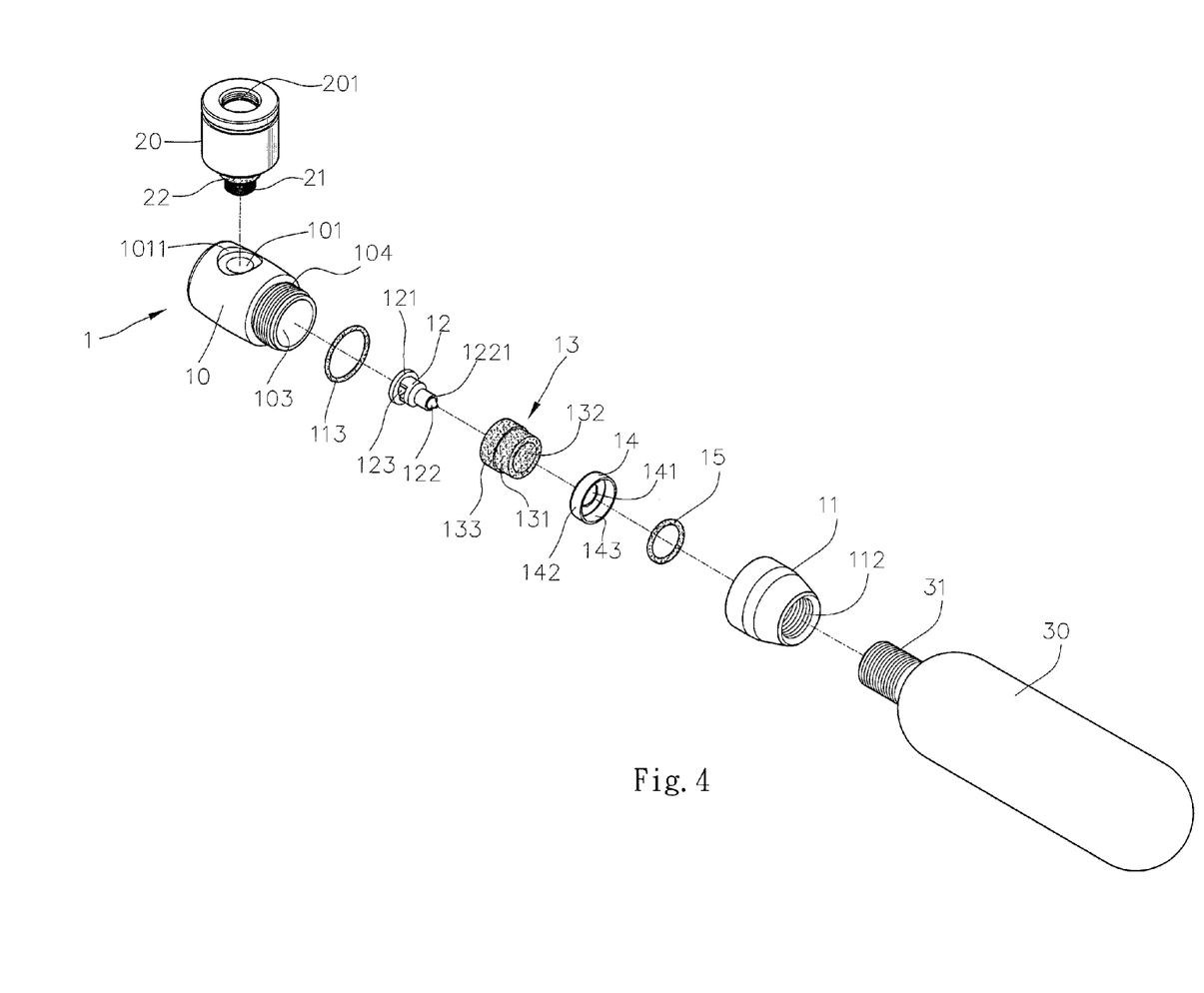
FIG. 4 shows another exploded, perspective view of the high-pressure inflation pump and the high-pressure gas container of FIG. 2.

To overcome the disadvantages of complicated structure of conventional $CO_2$ inflation pump, the present invention provides a high-pressure inflation pump that maintains pressure in a high-pressure gas container 30 when not in inflation operation and allows the high-pressure gas container 30 to be used many times while having enhanced structure. With reference to FIGS. 2-4, the high-pressure inflation pump according to the preferred teachings of the present invention includes a head 1 having first and second parts 10 and 11. The first part 10 has a threaded portion 104 that is threadedly engaged with a threaded portion 111 of the second part 111. An O-ring 113 is mounted between the threaded portions 104 and 111. A compartment 103 is formed after coupling of the first and second parts 10 and 11. The first part 10 includes a passageway 102 in communication with the compartment 103. The passageway 102 includes an opening 101 formed in an outer periphery of the head 1. The opening 101 has an enlarged outer section with an annular bottom face 1011. The second part 11 of the head 1 further includes a threaded section 112 on an end opposite to the first part 11. The compartment 103 is located intermediate the passageway 102 and the threaded section 112. In the most preferred form shown, the threaded section 112 includes a screw hole and is adapted to be engaged with a threaded end 31 of the high-pressure gas container 30. An end face 311 of the threaded end 31 of the high-pressure gas container 30 is located in the compartment 103 after the threaded end 31 of the high-pressure gas container 30 is threadedly engaged with the threaded section 112. A nozzle 20 is mounted to a side of the head 1. The nozzle 20 includes a connecting end 21 engaged in the opening 101 of the head 1. An O-ring 22 is mounted around the connecting end 21 and received in the enlarged outer section of the opening 101 and abuts against the annular bottom face 1011 to provide a sealing effect. The nozzle 20 further includes a valve engaging portion 201 with inner threading for engagement with outer threading of a valve of a tire to be inflated.

According to the preferred form shown, a piercing member 12 is mounted in the compartment 103 and includes a base 121 and a piercing portion 122. The base 121 has an outer diameter larger than a diameter of the passageway 102. The base 121 includes a hole 124 in communication with the passageway 102. The base 121 abuts an intersection of the compartment 103 and the passageway 102. The piercing portion 122 includes a pointed end to provide a piercing effect. The piercing portion 122 further includes an annular abutting shoulder 1221 adjacent the pointed end. When the pointed end of the piercing portion 122 pierces the end face 311 of the high-pressure gas container 30, the annular abutting shoulder 1221 abuts against the end face 311 to provide an airtight sealing state. Namely, the pressure in the high-pressure gas container 30 will be maintained without the risk of outflow of the gas in the high-pressure gas container 30 when the annular abutting shoulder 1221 abuts against the end face 311. Thus, the high-pressure gas container 30 can be used many times by provision of the annular abutting shoulder 1221 that maintains the pressure in the high-pressure gas container 30. A guiding hole 123 extends in a radial direction from an outer periphery of the base 10 through the hole 124 of the base 121. The guiding hole 123 and the hole 124 of the base 121 serve to guide high-pressure gas from the high-pressure gas container 30 to the passageway 102.

Figure 5:
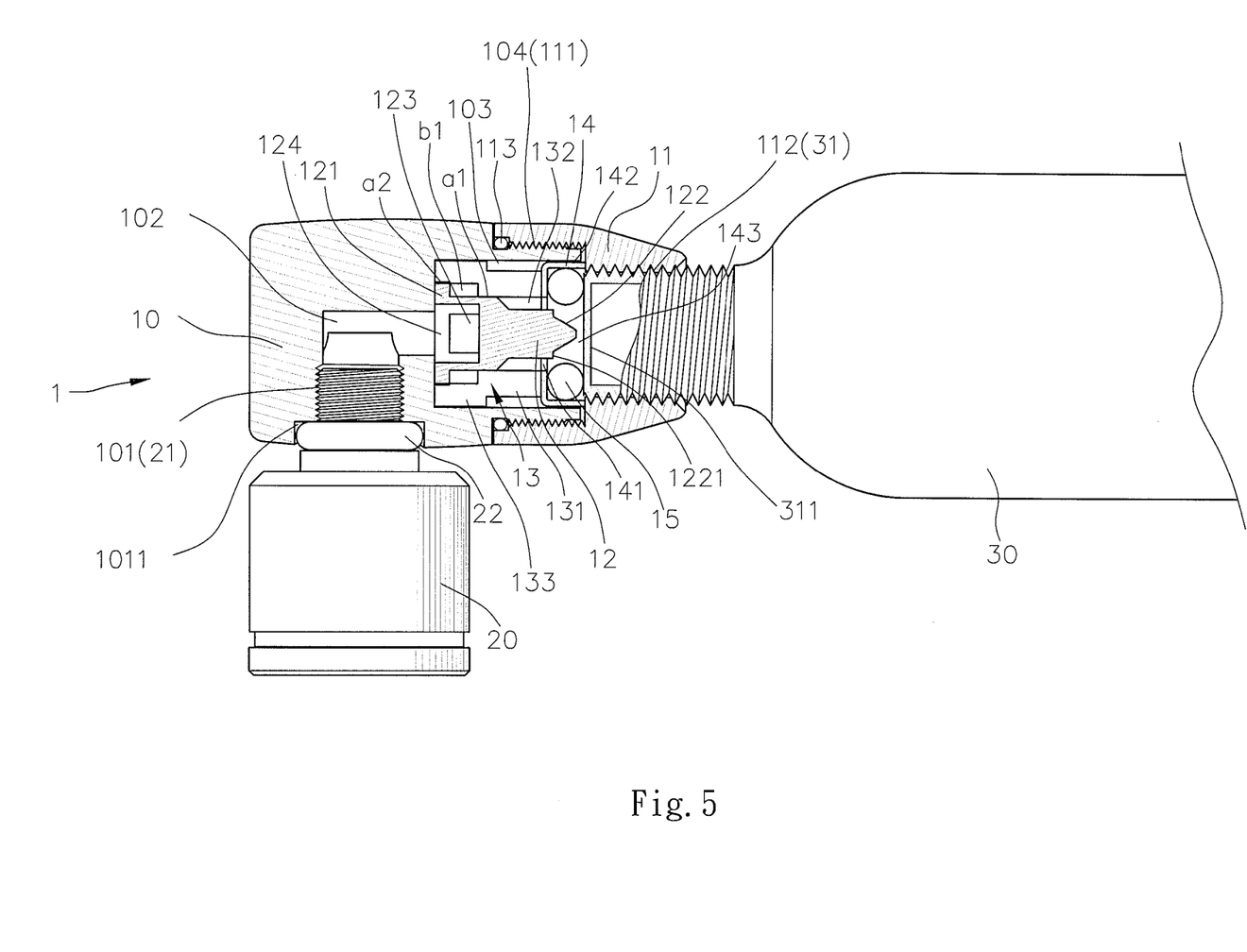
FIG. 5 shows a cross sectional view of the high-pressure inflation pump and the high-pressure gas container of FIG. 2 with the high-pressure gas container not pierced.

According to the preferred form shown, a resilient member 13 is mounted in the compartment 103 and around the piercing member 12 to assure effective piercing of the piercing member 12 during each inflation operation and to provide reliable, repeated sealing. With reference to FIG. 5, the resilient member 13 includes a support end 133, a pressing end 131, and a chamber 132 in the support end 133 and the pressing end 131. In the most preferred form shown, the chamber 132 is in the form of a through-hole extending from the support end 133 through the pressing end 131. The piercing member 122 is received in the chamber 132 with a deformation space b1 formed between an outer periphery of the piercing member 12 and an inner periphery of the chamber 132. The pressing end 131 receives the piercing portion 122, and the support end 133 receives the base 121. The inner periphery of the chamber 132 contacts an outer periphery of the piercing portion 122 at the pressing end 131 by at least one contact point a1. The inner periphery of the chamber 132 contacts with the outer periphery of the base 121 at the support end 133 by at least one contact point a2. The deformation space b1 is located intermediate the contact points a1 and a2, which further enhances the interior sealing effect of the high-pressure inflation pump according to the preferred teachings of the present invention during inflation operation.

According to the preferred form shown, a pressing member 14 is mounted between the end face 311 of the high-pressure gas container 30 and the pressing end 131 of the resilient member 13. In the most preferred form shown, the pressing member 14 is in the form of an annular plate having a through-hole 141 through which the piercing portion 122 of the piercing member 12 extends. The pressing member 14 includes a peripheral wall 142 extending perpendicularly from a side thereof and defining a receiving space 143 in communication with the through-hole 141. The pressing member 14 abuts the pressing end 131 of the resilient member 13. When the end face 311 of the high-pressure gas container 30 is rotated into the compartment 103, the pressing member 14 is sandwiched between the end face 311 of the high-pressure gas container 30 and the pressing end 131 of the resilient member 13, preventing the pressing end 131 from being worn and damaged by the rotating end face 311. According to the preferred form shown, a resilient ring 15 is mounted in the receiving space 143 of the pressing member 14. When the end face 311 of the high-pressure gas container 30 is rotated into the compartment 103, the resilient ring 15 is sandwiched between the pressing member 14 and the end face 311, providing an airtight effect. The sealing ring 15, when worn out after being used by many times, can be removed from the pressing member 14 and replaced with a new one, allowing easy maintenance.

Figure 6:
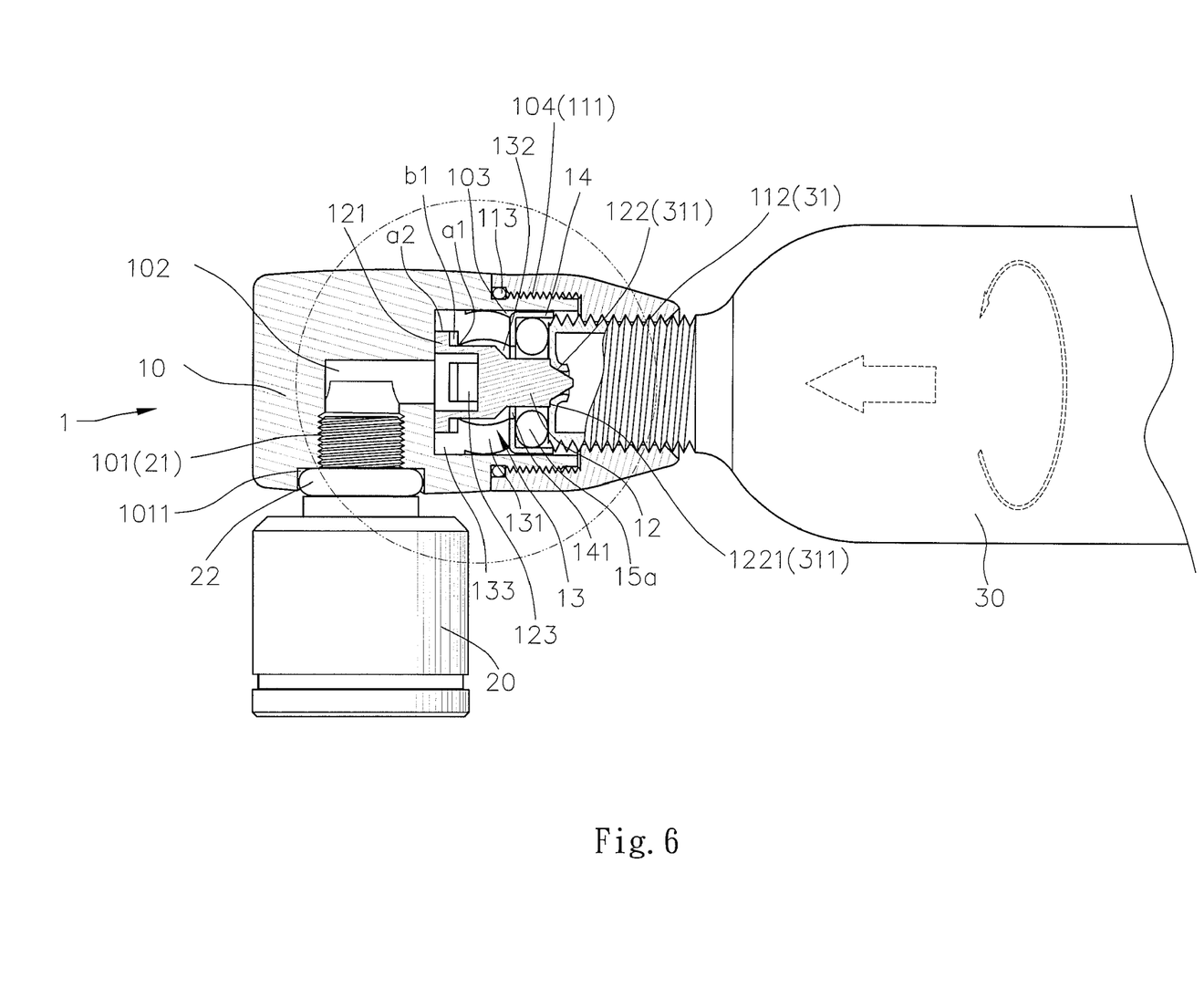
FIG. 6 shows another cross sectional view of the high-pressure inflation pump and the high-pressure gas container of FIG. 2 with the high-pressure gas container pierced by rotating the high-pressure gas container in a direction.

With reference to FIG. 6, a user can rotate the high-pressure gas container 30 in a direction moving the threaded end 31 towards the piercing member 12. The end face 311 of the threaded end 31 is pierced by the piercing portion 122, and the resilient member 13 is compressed and deformed. Note that the high-pressure gas container 30 is in a non-inflating position, and the pierced end face 311 presses against and is completely in surface contact with the pointed end of the piercing portion 122 and the annular abutting shoulder 1221. The deformation space b1 provides a room for the deformed resilient member 13. Furthermore, the contact points a1 and a2 of the resilient member 13 remains in contact with the outer periphery of the piercing member 12 during deformation of the resilient member 13, maintaining the piercing member 12 in the compartment 103. Furthermore, the contact point a1 between the inner periphery of the chamber 132 and the outer periphery of the piercing portion 122 at the pressing end 131 of the deformed resilient member 13 does not block flow of gas to the guiding hole 123. Since no gap exist between the pierced end face 311 and the pointed end of the piercing portion 122 and the annular abutting shoulder 1221, the gas in the high-pressure gas container 30 can not flow outward. Through threading coupling between the threaded section 112 and the threaded end 31, the end face 311 of the high-pressure gas container 30 can be repeatedly moved forward and backward to provide repeatable sealing state as long as the end face 311 presses against and is completely in surface contact with the pointed end of the piercing portion 122 and the annular abutting shoulder 1221. Particularly, the annular abutting shoulder 1221 and the end face 311 are in contact with and parallel to each other to increase the sealing area. Expansion of the pierced portion of the end face 311 resulting from repeated piercing will not deteriorate the sealing between the annular abutting shoulder 1221 and the end face 311, providing the best sealing effect. Note that the resilient ring 15 is deformed (see deformed resilient ring 15a in FIG. 6). However, the deformed resilient ring 15a will not come in contact with the outer periphery of the piercing portion 122, allowing smooth passage of the gas. Nevertheless, the resilient ring 15a provides a sealing effect between the end face 311 and the compartment 103 such that the gas will not leak via the threading connection at the threaded portions 104 and 111, maximizing the overall sealing effect.

Figure 7:
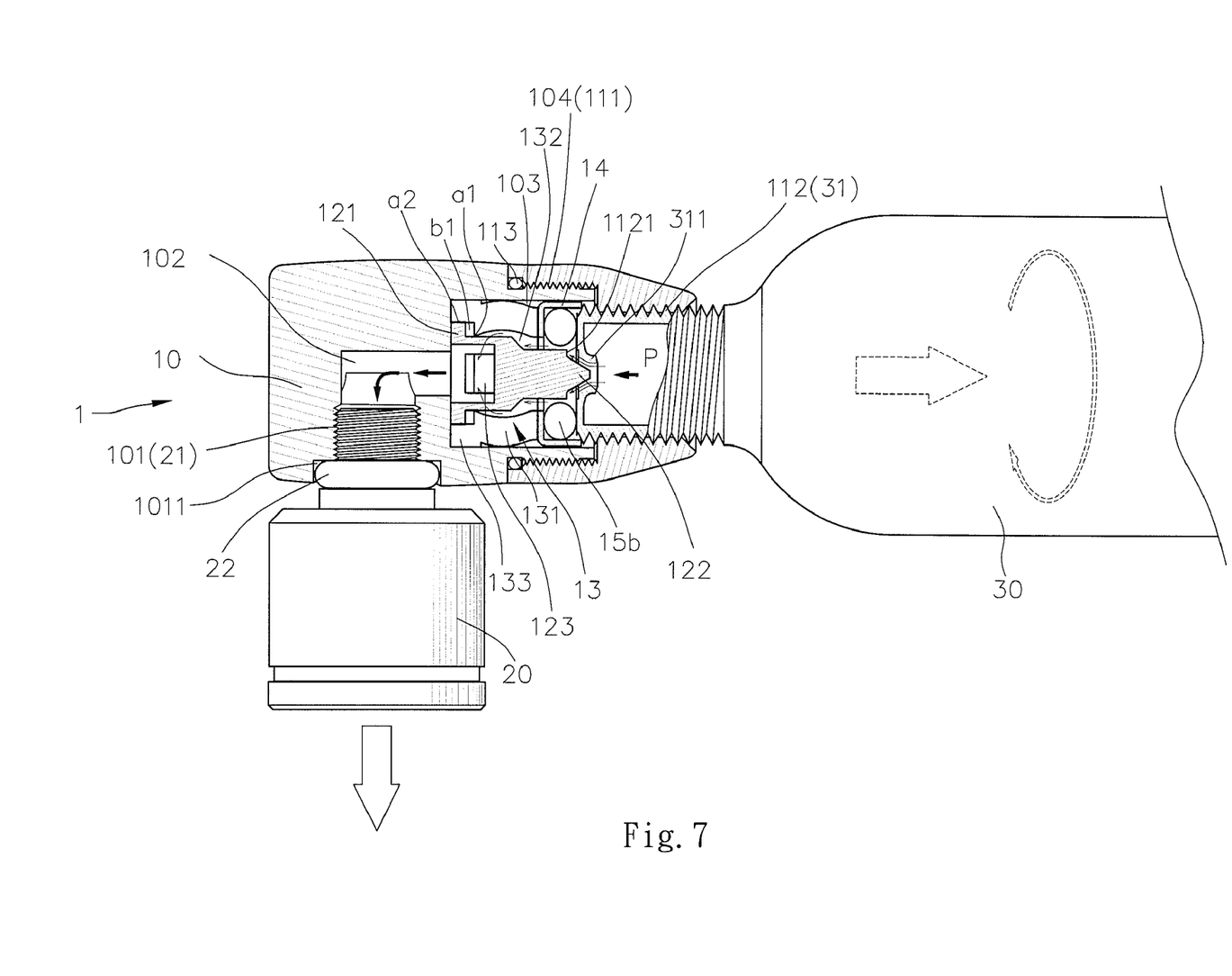
FIG. 7 shows another cross sectional view of the high-pressure inflation pump and the high-pressure gas container of FIG. 6 with the high-pressure gas container rotated in a reverse direction for inflation purposes.
Figure 8:
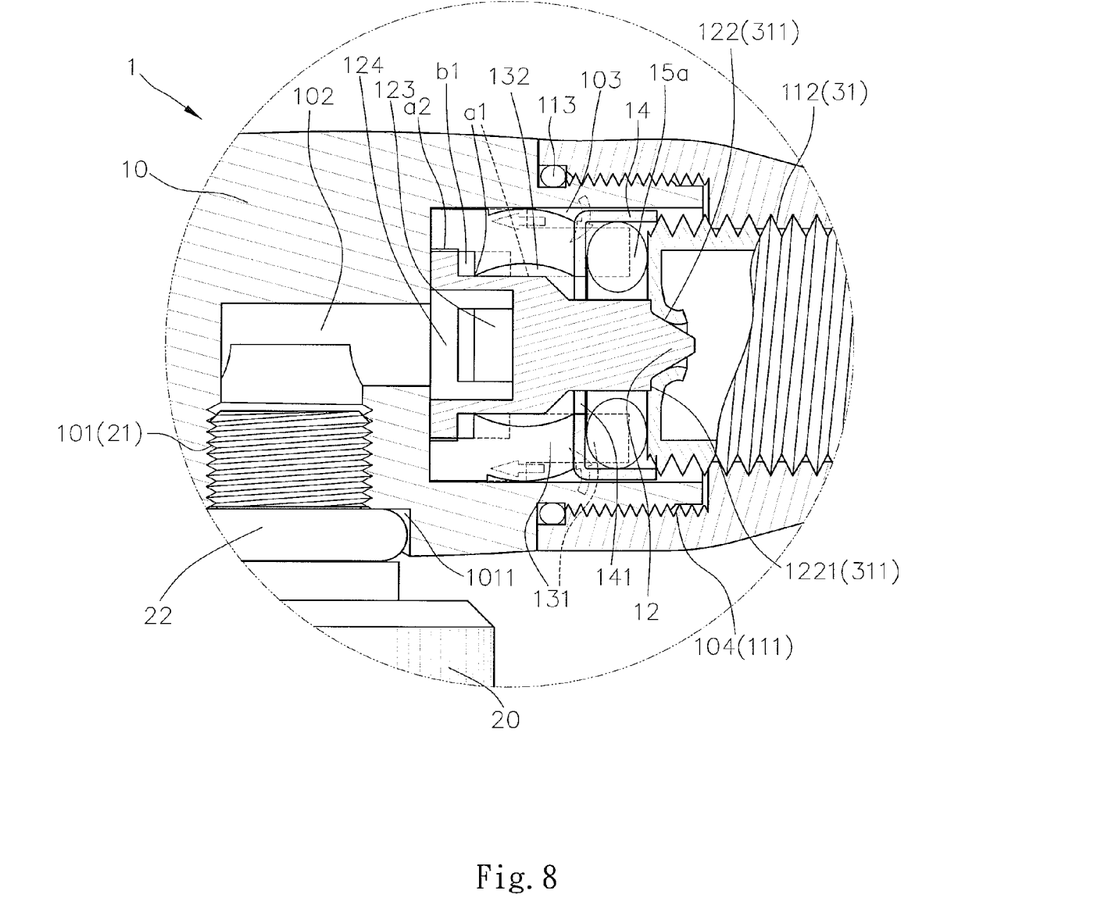
FIG. 8 shows an enlarged view of a circled portion of FIG. 6.

With reference to FIG. 7, when the user rotates the high-pressure gas container 30 about a quarter round in a reverse direction, the end face 311 is disengaged from the piercing member 12, and a hole is left in the deformed portion of the end face 311 pierced by the piercing member 12. A passageway is, thus, formed between an inner periphery of the hole and the piercing portion 122 of the piercing member 12 and the annular abutting shoulder 1221. In this case, the pressure P of the gas flowing out of the high-pressure gas container 30 enters the compartment 103 and exerts a different pressure corresponding to the rotational travel of the high-pressure gas container 30 in the reverse direction. Due to the sealing between the end face 311 and the compartment 103 provided by the resilient ring 15, the pressure P of the gas enters the chamber 132 via the through-hole 141. Then, the gas flows through the guiding hole 123, the hole 124, the passageway 102, and the nozzle 20 to the tire valve (not shown) coupled to the nozzle 20. In this case, the contact point a1 will not block the gas from flowing into the guiding hole 123, although the position of the contact point a1 after deformation is slightly restored. Furthermore, the deformed resilient ring 15b does not abut against the outer periphery of the piercing portion 122, allowing smooth passage of the gas.

When the high-pressure gas container 30 is moved backward, the resilient member 13 gradually restores to its uncompressed state or a slightly compressed state. It can be appreciated that the contact points a1 and a2 remain in contact with the outer periphery of the piercing member 12 during deformation of the resilient member 13, maintaining the position of the piercing member 12 in the compartment 103. During repeated sealing and pressure release mentioned above, the piercing member 12 and the end face 311 can be in an optimal contact position every time they comes in contact with each other due to pressing by the resilient member 13 plus abutting of the end face 311 against the pointed end of the piercing portion 122 and the annular abutting shoulder 1221. This allows the high-pressure inflation pump according to the preferred teachings of the present invention to provide long-term sealing and to permit repeated use of the same high-pressure gas container 30 until the high-pressure gas container 30 is empty. Furthermore, the inflation operation can begin after merely rotating the high-pressure gas container 30 a quarter round in a direction, and sealing of the high-pressure gas container 30 can be obtained again after rotating the high-pressure gas container 30 a quarter round in a reverse direction. Thus, the user can simply rotate the high-pressure gas container 30 for inflation purposes.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A high-pressure inflation pump comprising, in combination:

a head including a compartment, a passageway in communication with the compartment, and a threaded section, with the compartment located intermediate the passageway and the threaded section, with the passageway including an opening formed in an outer periphery of the head, with the threaded section adapted to engage with a threaded end of a high-pressure gas container;

a nozzle mounted to the opening of the head, with the nozzle adapted to engage with a valve of a tire and to guide high-pressure gas in the high-pressure container flowing through the passageway into the tire for inflating the tire;

a piercing member received in the compartment of the head, with the piercing member including a base and a piercing portion, with the base having an outer diameter larger than a diameter of the passageway, with the base abutting an intersection of the compartment and the passageway, with the piercing portion including an annular abutting shoulder, with the piercing portion adapted to pierce an end face of the threaded end of the high-pressure gas container, with the annular abutting shoulder adapted to press against the end face of the threaded end of the high-pressure gas container when the end face of the threaded end of the high-pressure gas container is pierced by the piercing portion and when the high-pressure gas container is in a non-inflating position, with the base including a hole in communication with the passageway, with the base further including an air guiding hole extending from an outer periphery of the base through the hole; and a resilient member received in the compartment, with the resilient member including a support end, a pressing end, and a chamber formed in the support end and the pressing end, with the piercing member received in the chamber with a deformation space formed between an outer periphery of the piercing member and an inner periphery of the chamber, with the inner periphery of the chamber contacting an outer periphery of the piercing portion at the pressing end by at least one first contact point, with the inner periphery of the chamber contacting the outer periphery of the base at the support end by at least one second contact point.

2. The high-pressure inflation pump as claimed in claim 1, with the head including first and second parts, with the first part including a first threaded portion, with the second part including a second threaded portion threadedly engaged with the first threaded portion, with the compartment formed in the first and second parts that are threaded engaged with each other.

3. The high-pressure inflation pump as claimed in claim 2, with the passageway of the head formed in the first part.

4. The high-pressure inflation pump as claimed in claim 2, with the second part including an end opposite to the first part, with the threaded section including a screw hole formed in the end of the second part.

5. The high-pressure inflation pump as claimed in claim 1, further comprising, in combination: a pressing member mounted to the pressing end of the resilient member, with the pressing member including an annular plate having a through-hole, with the pressing member sandwiched between the pressing end of the resilient member and the end face of the high-pressure gas container when the end face of the high-pressure gas container is received in the compartment, preventing the pressing end of the resilient member from being damaged by the end face while the high-pressure gas container is rotated.

6. The high-pressure inflation pump as claimed in claim 5, further comprising, in combination: a resilient ring, with the pressing member including a peripheral wall defining a receiving space in communication with the through-hole of the pressing member, with the resilient ring received in the receiving space.

7. The high-pressure inflation pump as claimed in claim 6, with the resilient ring sandwiched between the pressing member and the end face of the high-pressure gas container received in the compartment, providing an airtight effect between the pressing member and the end face of the high-pressure gas container.

8. The high-pressure inflation pump as claimed in claim 1, with the nozzle including a connecting end engaged in the opening of the head, with the nozzle further including a valve engaging portion having inner threading, with the inner threading of the valve engaging portion adapted to engage with outer threading of the valve of the tire.

9. The high-pressure inflation pump as claimed in claim 1, with the deformation space located intermediate said at least one first contact point and said at least one second contact point.

10. The high-pressure inflation pump as claimed in claim 1, with the resilient member being deformed when the high-pressure gas container is in the non-inflating position, with said at least one first contact point between the deformed resilient member and the outer periphery of the piercing member being in a position not blocking flow of gas into the air guiding hole.

11. A high-pressure inflation pump comprising, in combination:

a head including a compartment, a passageway in communication with the compartment, and a threaded section, with the compartment located intermediate the passageway and the threaded section, with the passageway including an opening formed in an outer periphery of the head, with the threaded section adapted to engage with a threaded end of a high-pressure gas container;

a nozzle mounted to the opening of the head, with the nozzle adapted to engage with a valve of a tire and to guide high-pressure gas in the high-pressure container flowing through the passageway into the tire for inflating the tire;

a piercing member received in the compartment of the head, with the piercing member including a base and a piercing portion, with the base having an outer diameter larger than a diameter of the passageway, with the base abutting an intersection of the compartment and the passageway, with the piercing portion including an annular abutting shoulder, with the piercing portion adapted to pierce an end face of the threaded end of the high-pressure gas container, with the annular abutting shoulder adapted to press against the end face of the threaded end of the high-pressure gas container when the end face of the threaded end of the high-pressure gas container is pierced by the piercing portion and when the high-pressure gas container is in a non-inflating position, with the base including a hole in communication with the passageway, with the base further including an air guiding hole extending from an outer periphery of the base through the hole;

a resilient member received in the compartment, with the resilient member including a support end, a pressing end, and a chamber;

a pressing member mounted to the pressing end of the resilient member, with the pressing member including an annular plate having a through-hole; and a resilient ring mounted in the pressing member, with the resilient ring sandwiched between the pressing member and the end face of the high-pressure gas container received in the compartment, providing an airtight effect between the pressing member and the end face of the high-pressure gas container.

12. The high-pressure inflation pump as claimed in claim 11, with the head including first and second parts, with the first part including a first threaded portion, with the second part including a second threaded portion threadedly engaged with the first threaded portion, with the compartment formed in the first and second parts that are threaded engaged with each other.

13. The high-pressure inflation pump as claimed in claim 12, with the passageway of the head formed in the first part.

14. The high-pressure inflation pump as claimed in claim 12, with the second part including an end opposite to the first part, with the threaded section including a screw hole formed in the end of the second part.

15. The high-pressure inflation pump as claimed in claim 11, with the chamber of the resilient member formed in the support end and the pressing end, with the piercing member received in the chamber with a deformation space formed between an outer periphery of the piercing member and an inner periphery of the chamber, with the inner periphery of the chamber contacting an outer periphery of the piercing portion at the pressing end by at least one first contact point, with the inner periphery of the chamber contacting the outer periphery of the base at the support end by at least one second contact point.

16. The high-pressure inflation pump as claimed in claim 15, with the deformation space located intermediate said at least one first contact point and said at least one second contact point.

17. The high-pressure inflation pump as claimed in claim 15, with the resilient member being deformed when the high-pressure gas container is in the non-inflating position, with said at least one first contact point between the deformed resilient member and the outer periphery of the piercing member being in a position not blocking flow of gas into the air guiding hole.

18. The high-pressure inflation pump as claimed in claim 11, with the nozzle including a connecting end engaged in the opening of the head, with the nozzle further including a valve engaging portion having inner threading, with the inner threading of the valve engaging portion adapted to engage with outer threading of the valve of the tire.

* * * * *